United States Patent [19]
Aarts

[11] Patent Number: 5,333,492
[45] Date of Patent: Aug. 2, 1994

[54] PROCESS AND APPARATUS FOR LEAK-TESTING A PACKAGE

[75] Inventor: Mathias L. C. Aarts, Bilthoven, Netherlands

[73] Assignee: Product Suppliers AG, Zug, Switzerland

[21] Appl. No.: 111,965

[22] Filed: Aug. 26, 1993

Related U.S. Application Data

[63] Continuation of Ser. No. 946,783, Sep. 18, 1992, abandoned, which is a continuation of Ser. No. 672,677, Mar. 20, 1991, abandoned.

[30] Foreign Application Priority Data

Mar. 20, 1990 [NL] Netherlands .......... 9000641

[51] Int. Cl.⁵ ............................ G01M 3/34
[52] U.S. Cl. ............................ 73/49.3; 73/52
[58] Field of Search ............ 73/49.3, 49.8, 52

[56] References Cited

U.S. PATENT DOCUMENTS

| | | | |
|---|---|---|---|
| 3,400,580 | 9/1968 | Haren et al. | 73/46 |
| 3,857,278 | 12/1974 | Jenkins et al. | 73/49.3 |
| 3,960,002 | 6/1976 | Choksi et al. | 73/52 |
| 4,315,427 | 2/1982 | Leiter et al. | 73/52 |
| 4,593,554 | 6/1986 | Aarts | 73/49.3 |
| 4,689,987 | 9/1987 | Aarts | 73/49.3 |
| 4,756,184 | 7/1988 | Reishus et al. | 73/49.3 |
| 4,862,732 | 9/1989 | Raymond et al. | 73/49.3 |
| 4,864,848 | 9/1989 | Irvine | 73/49.3 |
| 4,905,501 | 3/1990 | Sawatani | 73/40 |
| 4,930,342 | 6/1990 | McDaniel | 73/52 |
| 4,934,180 | 6/1990 | Hulsman | 73/49.3 |
| 4,951,496 | 8/1990 | Aarts | 73/49.3 |
| 5,042,291 | 8/1991 | Lehmann | 73/49.3 |

FOREIGN PATENT DOCUMENTS

| | | | |
|---|---|---|---|
| 0332239 | 9/1989 | | |
| 2108496 | 5/1972 | France . | |
| 0216023 | 8/1990 | Japan | 73/52 |
| WO8903521 | 4/1989 | PCT Int'l Appl. . | |
| 840294 | 7/1960 | United Kingdom . | |
| 2178858 | 2/1987 | United Kingdom . | |

*Primary Examiner*—Michael J. Tokar
*Assistant Examiner*—Raymond Y. Mah
*Attorney, Agent, or Firm*—Cushman Darby & Cushman

[57] ABSTRACT

A process and an apparatus for leak testing a package. The method includes placing a sheet-like and airtight wrapper around a part of the package liable to leakage, e.g. a closing element. Applying a higher pressure to the outside than to the inside of the wrapper for causing the wrapper to fit closely around the part of the package and for hermetically sealing the wrapper from a part of the package outside the part to be tested. Sealing the measuring space between the enveloped part of the package and the wrapper pressed against it from the surrounding space by applying a measuring pressure in the closed measuring space which is different from the pressure then prevailing in the package, and for measuring the change of pressure in the closed measuring space for a determined measuring time.

14 Claims, 1 Drawing Sheet

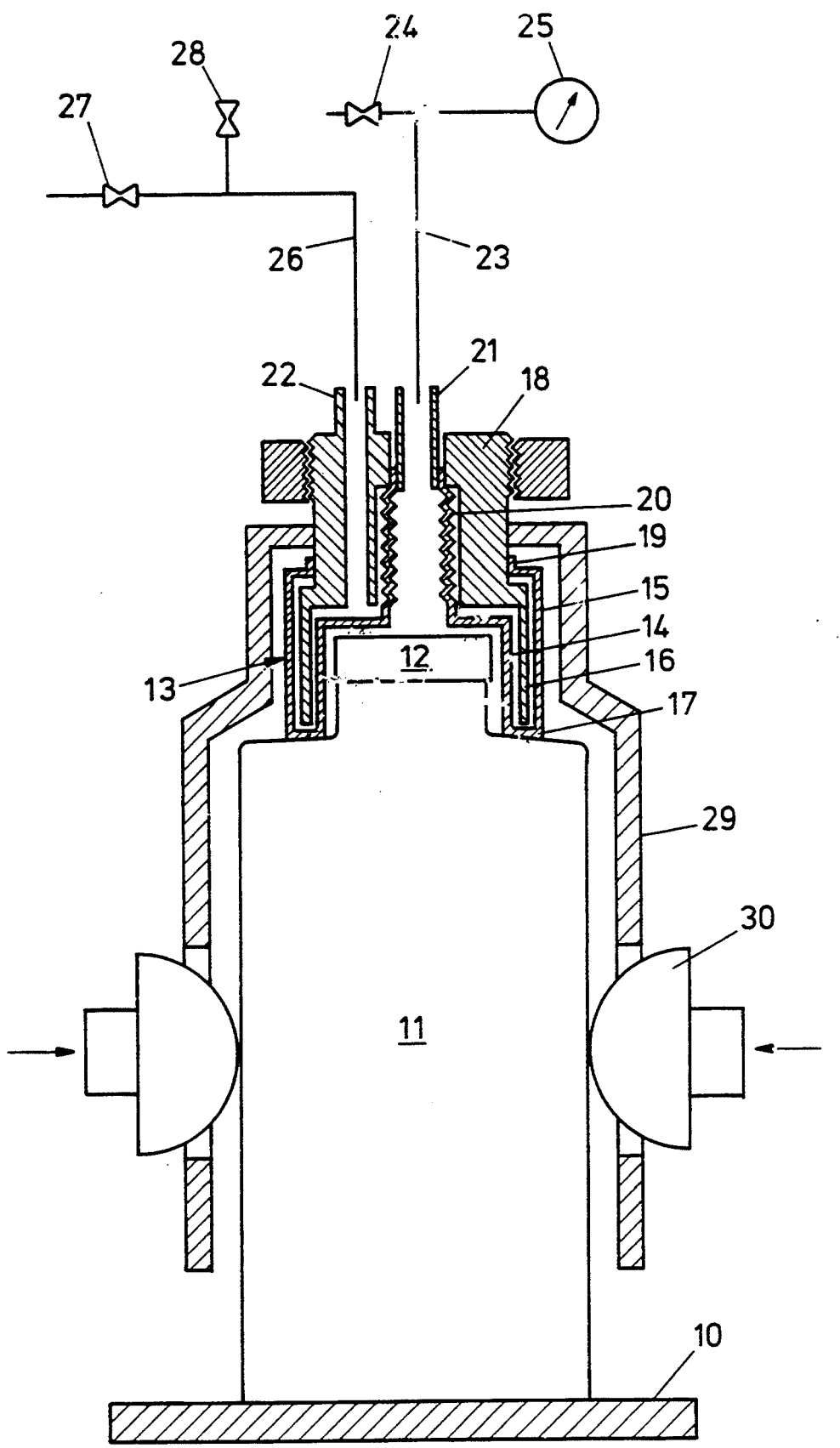

PROCESS AND APPARATUS FOR LEAK-TESTING A PACKAGE

This is a continuation of application Ser. No. 07/946,783, filed on Sep. 18, 1992, which was abandoned upon the filing hereof, which is a continuation of application Ser. No. 07/672,677, filed on Mar. 20, 1991, which was abandoned.

BACKGROUND OF THE INVENTION

The present invention relates to a process and an apparatus for leak testing a package.

European patent application 85.200.130.4 describes a method of leak testing vacuum packages. According to this method the vacuum package is placed in a sheet-like and air-tight wrapper, after which superatmospheric pressure is applied to the outside of the wrapper. This causes the wrapper to fit closely around the vacuum package. The small space remaining between the wrapper and the package is then sealed from the surrounding space, after which in this space the change of pressure is measured for a given period of time. A pressure variation is an indication of that the package leaks.

This prior art method is suitable for leak testing complete packages, e.g. vacuum-packed coffee, in which leaks may occur throughout the surface of the package.

In many packages such as jars or bottles made of glass or of a thermoplastic synthetic material, leak detection is only required where the jar or bottle is closed by a separately provided cover, screw cap or other closing element. For testing these types of packages, the prior art method of leak testing the complete package and therefore placing the package completely in a sheet-like wrapper is too laborious and time-consuming.

In another commercially sold testing apparatus, a bottle closed by a closing element can be leak tested by placing a bell over the closing element. With its lower edge, the bell rests on the shoulder of the bottle. Disposed along the lower edge of the bell is a specifically provided sealing ring, e.g. an inflatable O-ring. After inflating the O-ring, a seal of the bell against the shoulder of the bottle is obtained. An overpressure to a few bar or a vacuum is applied to the space between the bell and the bottle, which space is closed. When after some time the pressure in the closed space has changed, this may indicate that the closure of the bottle leaks.

This method is slow, owing to the relatively large volume in the bell to which, for each measurement, a pressure or a vacuum must be applied again. The repeated inflation of the O-ring is an additionally required step. Moreover, the seal between the bell and the bottle by means of an O-ring is less reliable, namely for two reasons. The first reason is that there is a rather great pressure differential over the O-ring (vacuum or overpressure at the inside and atmospheric pressure at the outside). The second reason is that the rather stiff O-ring is less able to adjust to the contours of the bottle, in particular when these contours are provided with a profile such as ribs, reliefs etc., or when the surface of the bottle shows roughnesses such as dents, grooves, etc. Consequently, this method is also unsuitable for rapidly and reliably testing closures of packages.

SUMMARY OF THE INVENTION

An object of the present invention is to provide a process and an apparatus for leak testing a package on the lines of the method known from the above mentioned European patent application, which, however, is adapted for testing the package only locally, rapidly and reliably, and with which, furthermore, a number of additional advantages are obtained over this prior art method, as will be explained below in the Detailed Description.

According to the present invention, there is provided a process for leak testing a package, which comprises:
placing a sheet-like and airtight wrapper around a part of the package liable to leakage, e.g. a closing element,
applying a higher pressure to the outside than to the inside of the wrapper for causing the wrapper to fit closely around the part of the package and for hermetically sealing the wrapper from a part of the package outside the part to be tested,
sealing the space ("measuring space") between the enveloped part of the package and the wrapper pressed against it from the surrounding space by applying a pressure ("measuring pressure") in the closed measuring space which is different from the pressure prevailing in the package at this moment, and
measuring the change of pressure in the closed measuring space for a determined measuring time.

The present invention also provides an apparatus for leak testing a package by the above outlined process, comprising:
a sheet-like and airtight wrapper for enveloping a part of the package liable to leakage,
means for generating a higher pressure at the outside than at the inside of the wrapper for causing the wrapper to fit closely around the said part of the package and for hermetically sealing the wrapper from a part of the package outside the part to be tested,
sealing means for sealing the space ("measuring space") between the enveloped part of the package and the wrapper pressed against it from the surrounding space in the presence of a pressure ("measuring pressure") in the closed measuring space which is different from the pressure prevailing in the package at that moment, and
measuring means for measuring the pressure variation in the closed measuring space for a determined measuring time.

BRIEF DESCRIPTION OF THE DRAWING

The present invention is further described hereinbelow with reference to the attached drawing, wherein:

The sole figure is a schematic depiction of apparatus for performing leak-testing of a closed polyethylene bottle filled with a liquid, according to principles of the present invention.

DETAILED DESCRIPTION

The present invention is suitable for testing filled rigid (dimensionally stable) packages, e.g. bottles closed with a screw cap, spray cans, beer tins etc., the contents of which are under superatmospheric pressure, atmospheric pressure or subatmospheric pressure. Furthermore, the invention is in particular also suitable for testing semi-rigid packages such as filled bottles of polyethylene or another synthetic material, the contents of which are usually at atmospheric pressure.

The closing element may have any desired shape or embodiment such as a screw cap, stopper, crown cork, tear strip etc. The part of the package to be tested may also comprise a part of the package closed by glueing, welding or sealing.

The sheet-like and airtight wrapper may be structured in many ways. A thin-walled rubber bag will usually be satisfactory. Other possible embodiments of the wrapper are described in the above European patent application 85.200.130.4.

It is advisable to give the wrapper a shape corresponding roughly to that of the part of the package to be tested. Preferably, the wrapper is a double-walled rubber bag, in which a dimensionally stable frame, e.g. made of metal or a synthetic material, is placed between the outer and the inner wall of the bag. The outer and inner walls of the bag lie loosely against the frame and are connected with each other at the open end of the bag under the frame. Attached to the bag is an inlet for admitting compressed air into the space between the two walls. The bag as a whole is placed within a metal chamber; the space in the chamber communicates with the surrounding air.

Such a wrapper and a method of manufacturing it are described in more detail in European patent application 86.201.251.5.

After placing the wrapper over the part of the package to be tested, the wrapper is pressed against the package by admitting compressed air at the outside. In case the wrapper is a double-walled bag, the compressed air is blown into the space between the two opposite walls, so that the inner wall of the bag is pressed against the package. This results in a situation in which only a very small residual space is left between the package and the wrapper lying against it. Since already in the inoperative position the wrapper has approximately the shape of the package, only a slight amount of compressed air is sufficient to press the wrapper closely against the package. In consequence thereof, this also requires little time. In addition, the blowing of the wrapper against the package results in the situation that, at its lower edge lying against a part of the package outside the part to be tested, the wrapper is sealed from the surrounding space. If required, the surface of the part of the wrapper lying against the part of the package to be leak tested may be slightly roughened so as to ensure that the measuring space continues to form an integral space. Due to its flexible character, the sheet-like wrapper can adjust excellently to the contours and roughnesses, if any, in the surface of the package, and a good adjustment and thus a good seal of the wrapper from the package is obtained along the lower edge of the wrapper. It is therefore not necessary to provide a separate sealing means such as an O-ring. In this connection, it should also be considered that the pressure in the residual space is atmospheric in most cases, so that, when using the double-walled bag as a wrapper, the pressure is equal to atmospheric pressure at both sides of the part of the bag operative as a seal. The sealing part of the bag is then pressed against the package, e.g., at 1300 mbar.

The measuring space between wrapper and package, subjected to atmospheric pressure, is now closed from the outside air. For a determined measuring time of a few seconds, the pressure is observed in the closed measuring space as function of time. When the inside of the package is under vacuum, a leak in the package will allow air to flow from the measuring space into the package, so that the pressure in the measuring space decreases. Due to the very small volume of the measuring space, a slight leakage already results in a considerable pressure drop in this space. This may occur, the necessary arrangements having been made, in a manner as described for the testing of complete vacuum packages in the above European patent application 85.200.130.4.

Packages subjected to internal overpressure can be tested in a similar manner, in which a leak in the package will, of course manifest itself in a pressure rise, instead of a pressure drop in the closed measuring space. The total test cycle may be effected within a period of, e.g., 7-12 seconds.

The present invention is therefore very suitable for leak testing a dimensionally stable package with internal subatmospheric or superatmospheric pressure, in which an atmospheric pressure may be applied in the measuring space.

Another situation is present when the contents of the package are at atmospheric pressure. A pressure differential between the contents of the package and the measuring space may then be generated by connecting the measuring space, prior to closing it completely, with a space subjected to superatmospheric or subatmospheric pressure. This step is, of course, particularly useful in case of packages which hardly, if at all, change its shape at the overpressure or reduced pressure to be generated in the measuring space.

In accordance with a special embodiment of the invention, however, rigid packages subjected to internal atmospheric pressure can be tested with atmospheric measuring pressure, all the same, by previously increasing, through heating, the internal pressure in the package to a value above atmospheric pressure. Of course, separate heating is sometimes not necessary for the above purpose, if the closed package has already been heated for another purpose, e.g. for sterilizing the contents.

According to another embodiment of the invention, semi-rigid packages with normally internal atmospheric pressure are tested by first increasing the internal pressure in the package by elastically depressing the wall of the package, after which atmospheric pressure can again be applied in the measuring space. Preferably, the wall of the package is mechanically depressed in a place outside the enveloped part of the package. After termination of the test, the wall of the package springs back to its original form. This method is very suitable for testing thermoplastic bottles, in which test the cylindrical wall of the bottle is slightly depressed. The free volume in a bottle is usually small, so that a slight depression of the bottle already gives a considerable pressure rise in the free volume, e.g. to 1500 mbar.

It is generally observed that due to its being simple, the application of atmospheric measuring pressure possible in many cases is an important advantage of the present invention over more complicated prior art systems, in which this pressure is subatmospheric or superatmospheric.

It is sometimes possible to have the package depressed by the wrapper itself, e.g., by the bag expanding between chamber and package, which bag locally presses the package inwards.

If any change of shape of the enveloped part of the package is undesirable, the package may be depressed outside the enveloped part thereof, until the internal pressure in the package reaches a value equal to that with which the bag presses against the package.

When using the invention for testing the upper end of a package where the closure is, the apparatus can be moved down on the upper end of the package for carrying out all the steps required. It is possible to test a plurality of packages simultaneously, although each individually. If, as usual, the upper end (the neck) of the package to be tested is narrower than the lower part, it is possible in many cases to simultaneously test a large number of packages placed side by side and/or against each other. It is also possible, for instance, to test "en bloc" all the packages placed in a box or crate.

The drawing shows a base plate 10 on which is placed the bottle 11 to be tested. At its upper end the bottle is closed with a screw cap 12. Placed over the upper end of the bottle is a wrapper 13 consisting of a double-walled rubber bag with an inner wall 14 and an outer wall 15, between which is disposed a rigid frame 16. At their lower ends, the inner wall and the outer wall of the wrapper are connected with each other, thus forming a closed lower edge 17. The upper edge 19 of the outer wall of the wrapper is rigidly and tightly attached to an enlarged extension 18 of frame 16. The upper edge of the inner wall of the wrapper is connected with a bellows 20, the upper end of which is rigidly fixed between the extension 18 and a nipple 21. Connected to the nipple 21 is a line 23, which communicates with the surrounding air via an openable-closable valve 24. Moreover, a pressure gauge 25 is connected to line 23. At its upper end, the extension 18 of the frame is provided with a tubular inlet 22, to which is connected a line 26. Via an open valve 27 compressed air can be admitted into line 26, and further, into the space between the two walls 14, 15 of the wrapper. A second openable-closable valve 28 is connected to line 26, with which the space in the wrapper can be connected with the outside air. In many cases, the apparatus thus described will be sufficient, namely in those cases in which the contents of the bottle are under superatmospheric or subatmospheric pressure and atmospheric measuring pressure is applied.

In the present example for testing a bottle with atmospheric contents, the apparatus is extended by a cylindrical chamber 29 extending over the bottle. At its upper end, the chamber 29 is rigidly attached to the extension 18, its lower end extending to some distance above the bottom of the bottle. Via openings in the side wall of the chamber, pushing heads 30 can be pushed against the side wall of the bottle for depressing the bottle.

When using the apparatus, the bottle is placed on the base plate 10 and then moved upwards with the base plate, until the lower edge 17 of the wrapper comes to rest on the shoulder of the bottle. The two pushing heads 30 are pushed inwards, thus depressing the side wall of the bottle. Consequently, the pressure in the bottle rises, e.g., to 1500 mbar. valve 28 is closed and valve 27 opened, which causes compressed air to flow into the wrapper. As a result, the lower edge 17 is firmly pressed against the shoulder of the bottle, so that there the space between the wrapper and the bottle is sealed. On the other hand, the inner wall 14 of the wrapper is tightly pressed against the upper end of the bottle. During this operation, valve 24 is open, so that the space between the wrapper and the bottle communicates with the outside air. Valve 24 is now closed, after which the pressure variation in the measuring chamber between wrapper and bottle is monitored on pressure gauge 25 for a certain period of time. Sensed pressure variation may lead to conclusions with respect to whether the closure of the bottle leaks. Finally, valves 24 and 28 are reopened and pushing heads 30 withdrawn, after which the bottle can be removed from the apparatus and a next bottle can be tested.

What I claim is:

1. A method for leak testing a container having a body with an external surface and a closing element for an opening through said surface, which closing element has a perimetrical interface thereabout with said body, while said container contains fluid having a first pressure, said method comprising:

(a) establishing an annular seal with said surface of said container body perimetrically surrounding said closing element, using an axial end of a tubular wrapper made of flexible material;

(b) while maintaining said seal, closely fitting said tubular wrapper against said closing element on an axially opposite end of said closing element from said seal, by applying a greater pressure to an outer side than to an inner side of said tubular wrapper whereby the wrapper between said axial end and said axially opposed end is closely fit against said external surface of the container body and said closing element, so as to define between said surface, said closing element, said seal and said inner side of said tubular wrapper, a measuring space to which said perimetrical interface is exposed, and whereby said greater pressure presses said axial end of the wrapper in sealing engagement with said external surface of the container body;

(c) hermetically sealing said measuring space at a first time, at which said measuring space is fluid pressurized at a second pressure which is different from said first pressure; and (d) monitoring fluid pressure within measuring space until a second time, later than said first time, has come, and thereby looking for a change in pressure within said measuring space as an indication of fluid pressure leakage through said perimetrical interface.

2. The method of claim 1, wherein:

said first pressure at said first time is greater than atmospheric pressure and said second pressure is equal to atmospheric pressure.

3. The method claim 2, wherein:

said container is substantially rigid walled.

4. The method of claim 1, wherein:

said first pressure at said first time is below atmospheric pressure and said second pressure is equal to atmospheric pressure.

5. The method of claim 4, wherein:

said container is substantially rigid walled.

6. The method of claim 2, further including the preliminary step of:

causing said first pressure to become greater than atmospheric pressure by heating said container after said closing element has been applied to said opening of said body, steps (a)–(d) being conducted while said container thereby remains at an elevated temperature relative to ambient temperature.

7. The method of claim 2, wherein said container is flexible-walled, and said method further includes the preliminary step of:

causing said first pressure to become greater than atmospheric pressure by squeezing said container after said closing element has been applied to said opening of said body, using a given squeezing force, so as to decrease contained volume within said container, steps (a)–(d) being conducted while said given squeezing force remains applied to said container.

8. The method of claim 7, wherein:
said squeezing force is applied to said container at a region of said container body which remains axially beyond said measuring space.

9. The method of claim 7, wherein:
said squeezing force is applied to said container within said measuring space via said tubular wrapper.

10. The method of claim 1, wherein:
said tubular wrapper is a double-walled bag having said seal formed at a closed end between radially spaced inner and outer walls of said bag, and step (c) is conducted by closing-off said tubular wrapper at an opposite end from said closed end, and, while radially confining said outer wall of said bag, inflating a space enclosed within said bag radially between said inner and outer walls, thereby forcing said inner wall against said surface of said body and said closing element, and step (d) is conducted by monitoring fluid pressure between said inner wall of said bag and said container.

11. Apparatus for leak testing a container having a body with an external surface and a closing element for an opening through said surface, which closing element has a perimetrical interface thereabout with said body, while said container contains fluid having a first pressure,
said apparatus comprising:
(a) means for establishing an annular seal with said surface of said container body perimetrically surrounding said closing element, using an axial end of a tubular wrapper made of flexible material;
(b) means for while maintaining said seal, closely fitting said tubular wrapper against said closing element on an axially opposite end of said closing element from said seal, by applying a greater pressure to an outer side than to an inner side of said tubular wrapper whereby the wrapper between said axial end and said axially opposed end is closely fit against said external surface of the container body and said closing element, so as to define between said surface, said closing element, said seal and said inner side of said tubular wrapper, a measuring space to which said perimetrical interface is exposed, and whereby said greater pressure presses said axial end of the wrapper in sealing engagement with said eternal surface of the container body;
(c) means for hermetically sealing said measuring space at a first time, at which said measuring space is fluid pressurized at a second pressure which is different from said first pressure; and
(d) means for monitoring fluid pressure within measuring space until a second time, later than said first time, has come, and thereby looking for a change in pressure within said measuring space as an indication of fluid pressure leakage through said perimetrical interface.

12. The apparatus of claim 11, further including:
means for causing said first pressure to become greater than atmospheric pressure by squeezing said container after said closing element has been applied to said opening of said body, using a given squeezing force, so as to decrease contained volume within said container so that said container can be leak-tested while said given squeezing force remains applied to said container.

13. The apparatus of claim 12, wherein:
said means for causing said first pressure to become greater comprises means for applying said squeezing force to said container at a region of said container body which remains axially beyond said measuring space.

14. The apparatus of claim 11, wherein:
said tubular wrapper is a double-walled bag having said seal formed at a closed end between radially spaced inner and outer walls of said bag;
said means for elastically deforming said tubular wrapper including means for radially confining said outer wall of said bag and means for inflating a space enclosed within said bag radially between said inner and outer walls, thereby forcing said inner wall against said surface of said body and said closing element.

* * * * *